Figure 1:
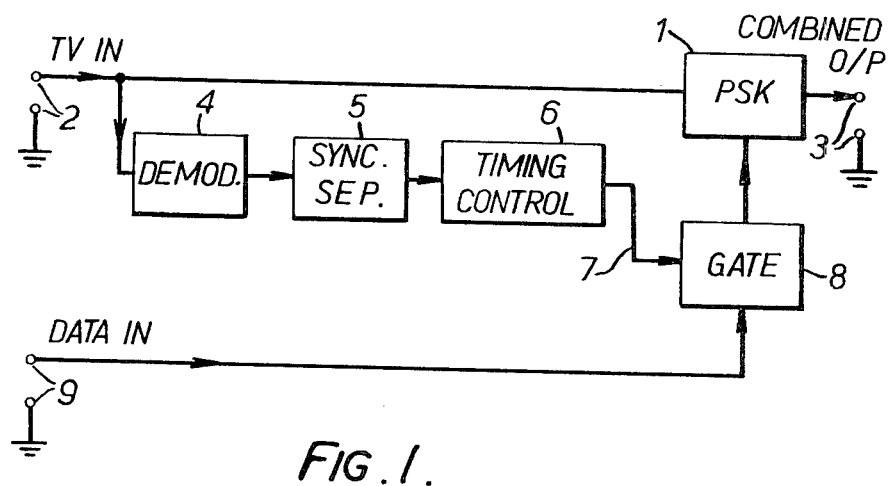

United States Patent [19]
Baker

[11] 3,941,919
[45] Mar. 2, 1976

[54] METHOD AND APPARATUS FOR EFFECTING DIGITAL SIGNALLING OVER TELEVISION SIGNAL CHANNELS

[75] Inventor: Henry Louis Baker, Northwood, England

[73] Assignee: Communications Patents Limited, London, England

[22] Filed: Aug. 15, 1974

[21] Appl. No.: 497,650

[52] U.S. Cl. ............................................. 178/5.6
[51] Int. Cl.² .......................................... H04N 7/06
[58] Field of Search ................................. 178/5.6

[56] References Cited
UNITED STATES PATENTS

| | | | |
|---|---|---|---|
| 2,326,515 | 8/1943 | Bartelink | 178/5.6 |
| 2,453,773 | 11/1948 | Young | 178/5.6 |
| 3,529,081 | 9/1970 | Rider | 178/5.6 |

Primary Examiner—Howard W. Britton
Assistant Examiner—John C. Martin
Attorney, Agent, or Firm—Laurence R. Brown

[57] ABSTRACT

A method and apparatus for effecting digital signalling over a television signal channel is provided. The carrier wave of the television signal is phase shift keyed at the line scanning frequency rate in accordance with the digital information to be signalled. A receiver determines the phase of the said carrier wave during each line of a received television signal relative to a datum phase and a digital signal is generated in accordance therewith.

11 Claims, 2 Drawing Figures

METHOD AND APPARATUS FOR EFFECTING DIGITAL SIGNALLING OVER TELEVISION SIGNAL CHANNELS

This invention relates to a method and apparatus for effecting digital signalling over television signal channels. The invention may be useful for conveying written or pictorial information, the tele-control of apparatus, for example, television receivers in pay television systems and for selective signalling.

According to the invention there is provided a method of effecting digital signalling over a television signal channel which comprises phase shift keying the carrier wave of the television transmission at the line scanning frequency rate in accordance with the digital information to be signalled and at the receiver determining the phase of said carrier wave during each line of a received television signal relative to a datum phase and generating a digital signal in accordance therewith.

The invention more specifically provides a method of effecting digital signalling over a television signal channel which comprises transmitting during each line of the television signal the carrier wave of the transmission either in phase or in anti-phase with an arbitary datum in accordance with the digital information to be signalled and at the receiver determining the phase relationship of said carrier wave during each line relative to said datum and generating a digital signal in accordance with said determination.

From another aspect the invention provides a system for effecting digital signalling over a television signal channel which comprises a transmitter including means for phase shift keying the carrier wave at the line scanning frequency rate in accordance with the digital information to be signalled and a receiver including means for determining during each line of the television signal the phase of a received carrier wave relative to a datum phase and means for generating a digital signal in accordance with said determination. From this aspect the invention more specifically provides a system for effecting digital signalling over a television signal channel which comprises a transmitter including means for transmitting during each line of the television transmission the carrier wave of said transmission either in phase or in anti-phase with an arbitary datum in accordance with the digital information to be signalled and a receiver including means for determining the phase relationship of said carrier wave during each line relative to said datum and means for generating a digital signal in accordance with said determination.

The invention further provides a transmitting apparatus for use in a system as set out above which comprises means for phase shift keying the carrier wave of the television transmission at the line scanning frequency rate in accordance with the digital information to be transmitted.

The invention also provides a receiving apparatus for use in a system as set out above which comprises means for determining during each line of a television signal the phase of the carrier wave relative to a datum phase and means for generating a digital signal in accordance with said determination.

Figure 2:
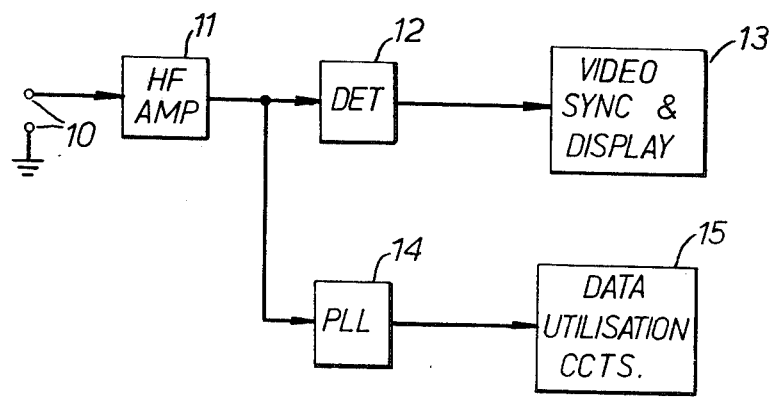

In order that the invention may be more readily understood one particular embodiment thereof will now be described by way of example only with reference to the accompanying drawings in which:

FIG. 1 is a block schematic diagram of part of a transmitting apparatus for effecting digital signalling over a television signal channel in accordance with the present invention, and FIG. 2 is a block schematic diagram of part of a receiving apparatus for use with the transmitting apparatus of FIG. 1.

In the arrangement shown in FIG. 1 high frequency modulated carrier wave television signals in a wired broadcasting system are applied to a phase shift keying arrangement 1 connected in the transmission path between input terminals 2 and output terminals 3 and effective to shift the phase of said carrier wave. Television signals passing between the input terminals 2 and the phase shift keying arrangement 1 are applied to a demodulator 4 and thence to a synchronising pulse separator 5. The synchronising pulses at the line scanning frequency rate are applied to a timing control device 6 which provides, in response to the applied pulses, gate enabling signals which are applied over the line 7 to a gate device 8. The gate device 8 controls the passage of data pulses applied to the data input terminals 9 to the phase shift keying arrangement 1.

An advantage of the arrangement described above is that insertion of the digital data into the television signals may be effected without the need to effect a demodulation/remodulation process. This advantage is particularly useful where the digital data is to be conveyed over a television channel in a wired broadcasting system because such signals are usually derived from an external source such, for example, as a broadcasting transmitter of a standard radiated broadcasting network. By gating the data signals, phase shifts applied to the carrier wave of the television transmitter are arranged to occur at such time that they are least likely to produce any visible or other disturbing effects on television receivers which may be responding to the television picture information. A preferred time to effect phase shifting is during either the back porch or the line synchronising pulse of the television wave form.

The receiving apparatus shown in FIG. 2 comprises a pair of input terminals 10 arranged to receive the high frequency modulated carrier wave television and data signals produced by the transmitting apparatus shown in FIG. 1. The signals are initially applied to a high frequency amplifier 11 before being passed to a demodulator 12 the output signals from which are utilised in known manner by the video, synchronising and display circuits of the receiver shown diagramatically at 13. The amplified high frequency signals at the output of the amplifier 11 are also applied to a phase locked loop 14 which, in known manner, may be arranged to detect shifts in phase of the carrier wave signal applied to it relative to an internally generated signal of reference phase. The output signals of the phase locked loop 14 are representative of the digital data and may be applied directly to the data utilisation circuits shown diagramatically at 15.

By utilising each line of the television signal the present invention enables digital data signalling to be effected over a television signal channel at a higher speed than systems previously proposed. For example, if the television signals are of the 625 or 525 line standards digital data signalling can be effected at a transmission rate of over 15 kb/s.

What is claimed is:

1. A method of effecting digital signalling over a television signal channel which comprises phase shift keying the carrier wave of the television transmission for the duration of a scanning line at the line scanning frequency rate in accordance with the digital information to be signalled and at the receiver determining the phase of said carrier wave during each line of a received television signal relative to a datum phase and generating a digital signal in accordance therewith.

2. A method as claimed in claim 1 which further comprises controlling the application of digital information whereby phase shifts are imparted to the carrier wave during the back porch of the television signal.

3. A system for effecting digital signalling over a television signal channel which comprises a transmitter including means for phase shift keying the carrier wave at the line scanning frequency rate for the duration of the scanning of a line in accordance with the digital information to be signalled and a receiver including means for determining during each line of the television signal the phase of a received carrier wave relative to a datum phase and means for generating a digital signal in accordance with said determination.

4. A system as claimed in claim 3, wherein the application of the digital signals to the phase shift keying means is arranged to be controlled by a gate device in turn arranged to be controlled by a synchronising means whereby changes of phase imparted to the carrier wave occur at predetermined times during the television signal.

5. A system as claimed in claim 4, wherein the synchronising means is arranged to act upon the gate device through the intermediary of a timing device.

6. A system as claimed in claim 5, wherein the phase shift keying means is controlled to impart phase changes to the carrier wave during the back porch of the television signal.

7. A transmitting apparatus for use in a system according to claim 3 which comprises means for transmitting during each line of the television transmission the carrier wave of the transmission either in phase or in anti-phase in accordance with the digital information to be transmitted.

8. A transmitting apparatus as claimed in claim 7, wherein the phase shift keying means is controlled to impart phase changes to the carrier wave during the back porch of the television signal.

9. A receiving apparatus for use in a system according to claim 3 which comprises means for determining during each line of a television signal the phase of the carrier wave relative to a datum phase and means for generating a digital signal in accordance with said determination.

10. A system for effecting digital signalling over a television signal channel which comprises a transmitter including means for transmitting during the duration of each line of the television transmission the carrier wave of said transmission either in phase or in anti-phase with an arbitary datum in accordance with the digital information to be signalled and a receiver including means for determining the phase relationship of said carrier wave during each line relative to said datum and means for generating a digital signal in accordance with said determination.

11. A method of effecting digital signalling over a television signal channel which comprises transmitting during the duration of each line of the television signal the carrier wave of the transmission either in phase or in anti-phase with an arbitary datum in accordance with the digital information to be signalled and at the receiver determining the phase relationship of said carrier wave during each line relative to said datum and generating a digital signal in accordance with said determination.

* * * * *